(12) United States Patent
Bentley et al.

(10) Patent No.: US 8,950,001 B2
(45) Date of Patent: *Feb. 3, 2015

(54) CONTINUAL PEER AUTHENTICATION

(75) Inventors: Jon Louis Bentley, New Providence, NJ (US); Michael J. Sammon, Watchung, NJ (US); Anjur Sundaresan Krishnakumar, Rocky Hill, NJ (US); David Mandel Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 669 days.

This patent is subject to a terminal disclaimer.

(21) Appl. No.: 12/207,222

(22) Filed: Sep. 9, 2008

(65) Prior Publication Data

US 2010/0064345 A1 Mar. 11, 2010

(51) Int. Cl.
*G06F 7/04* (2006.01)
*G06F 17/30* (2006.01)
*H04N 7/16* (2011.01)
*G06F 21/32* (2013.01)
*G06F 21/31* (2013.01)
(Continued)

(52) U.S. Cl.
CPC ............... *G06F 21/32* (2013.01); *G06F 21/31* (2013.01); *H04L 63/08* (2013.01); *H04L 12/06* (2013.01); *G06F 2221/2111* (2013.01); *G06F 2221/2115* (2013.01); *G06F 2221/2137* (2013.01)
USPC ............. 726/28; 455/410; 455/411; 713/182; 26/2

(58) Field of Classification Search
CPC ..... H04L 63/08; H04L 63/162; H04W 12/06; H04W 28/06; H04W 84/12
USPC .......... 713/182, 160, 153; 380/270; 379/265.01; 709/225; 726/4, 2, 28; 455/410, 411
See application file for complete search history.

(56) References Cited

U.S. PATENT DOCUMENTS 5,303,285 A * 4/1994 Kerihuel et al. .............. 455/461
5,848,156 A * 12/1998 Murakami .................... 380/243
(Continued)

FOREIGN PATENT DOCUMENTS

| JP | 2006092530 A | 4/2006 |
|---|---|---|
| WO | 02085019 A1 | 10/2002 |
| WO | 2007012831 A1 | 2/2007 |

OTHER PUBLICATIONS

IBM. "During-conversation Peer Initiated Identity Challenging and Authentication Algorithm for Instant Messaging Systems." IP Analysis Software. ip.com, Published, Sep. 25, 2006. Accessed Nov. 12, 2014. <http://ip.com/IPCOM/000140902>.*

(Continued)

*Primary Examiner* — Saleh Najjar
*Assistant Examiner* — Feliciano Mejia
(74) *Attorney, Agent, or Firm* — Maldjian Law Group LLC; John Maldjian; Alexander D. Walter

(57) ABSTRACT

A method for orchestrating peer authentication during a call (e.g., a telephone call, a conference call between three or more parties, an instant messaging [IM] chat session, etc.) is disclosed. In particular, a user is first authenticated in order to participate in a call (e.g., via entering a password, etc.), and subsequently during the call the user may be peer authenticated. In accordance with the illustrative embodiment, a user who participates in a call might be prompted to authenticate another user on the call based on particular events or user behavior during the call.

20 Claims, 2 Drawing Sheets

(51) Int. Cl.
*H04L 29/06* (2006.01)
*H04L 12/06* (2006.01)

(56) References Cited

U.S. PATENT DOCUMENTS

| | | | | |
|---|---|---|---|---|
| 6,014,085 | A * | 1/2000 | Patel | 455/410 |
| 6,253,202 | B1 | 6/2001 | Gilmour | |
| 6,282,183 | B1 | 8/2001 | Harris et al. | |
| 6,298,072 | B1 | 10/2001 | Koliczew | |
| 6,349,206 | B1 * | 2/2002 | Reichelt et al. | 455/421 |
| 6,484,033 | B2 * | 11/2002 | Murray | 455/456.3 |
| 6,788,772 | B2 | 9/2004 | Barak et al. | |
| 6,859,651 | B2 * | 2/2005 | Gabor | 455/411 |
| 6,983,278 | B1 | 1/2006 | Yu et al. | |
| 7,092,508 | B2 * | 8/2006 | Brown et al. | 379/265.06 |
| 7,139,390 | B2 * | 11/2006 | Brown et al. | 379/265.02 |
| 7,162,256 | B2 * | 1/2007 | Seligmann et al. | 455/456.6 |
| 7,181,620 | B1 * | 2/2007 | Hur | 713/171 |
| 7,221,949 | B2 * | 5/2007 | Clough | 455/456.3 |
| 7,233,997 | B1 * | 6/2007 | Leveridge et al. | 709/229 |
| 7,237,024 | B2 * | 6/2007 | Toomey | 709/224 |
| 7,246,236 | B2 | 7/2007 | Stirbu | |
| 7,263,179 | B2 * | 8/2007 | Sammon et al. | 379/88.21 |
| 7,293,284 | B1 * | 11/2007 | Bartram et al. | 726/10 |
| 7,320,143 | B2 * | 1/2008 | Le Pennec et al. | 726/30 |
| 7,334,013 | B1 * | 2/2008 | Calinov et al. | 709/201 |
| 7,392,048 | B2 * | 6/2008 | Seligmann et al. | 455/426.1 |
| 7,392,375 | B2 * | 6/2008 | Bartram et al. | 713/152 |
| 7,418,252 | B2 * | 8/2008 | Erskine et al. | 455/405 |
| 7,421,072 | B2 * | 9/2008 | Brotman et al. | 379/265.01 |
| 7,545,942 | B2 * | 6/2009 | Cohen et al. | 380/270 |
| 7,627,529 | B1 * | 12/2009 | Bauer et al. | 705/44 |
| 7,688,344 | B2 * | 3/2010 | Kimber et al. | 348/14.08 |
| 7,707,293 | B2 * | 4/2010 | Zhang | 709/227 |
| 7,720,208 | B1 * | 5/2010 | Kia et al. | 379/144.01 |
| 7,721,093 | B2 | 5/2010 | Sundararajan | |
| 7,734,912 | B2 * | 6/2010 | Ganesan et al. | 713/155 |
| 7,808,906 | B2 * | 10/2010 | Rao et al. | 370/235 |
| 8,108,528 | B2 * | 1/2012 | Jones et al. | 709/227 |
| 2001/0016038 | A1 | 8/2001 | Sammon et al. | 379/202.01 |
| 2002/0133716 | A1 * | 9/2002 | Harif | 713/201 |
| 2002/0147019 | A1 * | 10/2002 | Uhlik et al. | 455/452 |
| 2003/0108186 | A1 * | 6/2003 | Brown et al. | 379/266.01 |
| 2003/0118167 | A1 * | 6/2003 | Sammon et al. | 379/202.01 |
| 2003/0119506 | A1 * | 6/2003 | Singhai et al. | 455/435 |
| 2003/0156707 | A1 * | 8/2003 | Brown et al. | 379/265.06 |
| 2004/0035644 | A1 | 2/2004 | Ford et al. | |
| 2004/0054885 | A1 * | 3/2004 | Bartram et al. | 713/152 |
| 2004/0098588 | A1 * | 5/2004 | Ohba et al. | 713/169 |
| 2004/0122958 | A1 | 6/2004 | Wardrop | |
| 2004/0153518 | A1 * | 8/2004 | Seligmann et al. | 709/206 |
| 2004/0179660 | A1 * | 9/2004 | Sammon et al. | 379/88.19 |
| 2004/0189441 | A1 * | 9/2004 | Stergiou | 340/5.51 |
| 2004/0202306 | A1 * | 10/2004 | Brotman et al. | 379/265.01 |
| 2004/0214558 | A1 | 10/2004 | Chang et al. | |
| 2004/0216039 | A1 | 10/2004 | Lane et al. | |
| 2004/0218744 | A1 | 11/2004 | Nguyen et al. | |
| 2004/0236771 | A1 | 11/2004 | Colver et al. | |
| 2005/0070312 | A1 * | 3/2005 | Seligmann et al. | 455/456.6 |
| 2005/0091172 | A1 | 4/2005 | King et al. | |
| 2005/0135305 | A1 | 6/2005 | Wentink | |
| 2005/0250482 | A1 | 11/2005 | Seligmann et al. | |
| 2006/0004921 | A1 | 1/2006 | Suess et al. | |
| 2006/0014532 | A1 | 1/2006 | Seligmann et al. | |
| 2006/0030263 | A1 | 2/2006 | Seligmann et al. | |
| 2006/0095771 | A1 | 5/2006 | Appenzeller et al. | |
| 2006/0178567 | A1 | 8/2006 | Goh et al. | |
| 2006/0224477 | A1 | 10/2006 | Garcia et al. | |
| 2006/0256008 | A1 | 11/2006 | Rosenberg | |
| 2007/0033397 | A1 | 2/2007 | Phillips, II et al. | |
| 2007/0061881 | A1 | 3/2007 | Eyre | |
| 2007/0071180 | A1 * | 3/2007 | Kanada | 379/39 |
| 2007/0094497 | A1 * | 4/2007 | O'Gorman et al. | 713/168 |
| 2007/0112964 | A1 * | 5/2007 | Guedalia et al. | 709/227 |
| 2007/0118735 | A1 | 5/2007 | Cherrington et al. | |
| 2007/0162554 | A1 | 7/2007 | Branda et al. | |
| 2007/0171910 | A1 * | 7/2007 | Kumar | 370/392 |
| 2007/0214259 | A1 | 9/2007 | Ahmed et al. | |
| 2007/0230683 | A1 * | 10/2007 | Brown et al. | 379/266.01 |
| 2007/0265956 | A1 | 11/2007 | Epstein et al. | |
| 2007/0283027 | A1 | 12/2007 | Hoffmann | |
| 2007/0285504 | A1 * | 12/2007 | Hesse | 348/14.08 |
| 2008/0005095 | A1 | 1/2008 | Horvitz et al. | |
| 2008/0010200 | A1 | 1/2008 | Smith et al. | |
| 2008/0071761 | A1 | 3/2008 | Singh et al. | |
| 2008/0077976 | A1 | 3/2008 | Schulz | |
| 2008/0102766 | A1 | 5/2008 | Schultz | |
| 2008/0102790 | A1 | 5/2008 | Schultz | |
| 2008/0120718 | A1 | 5/2008 | Bentley et al. | |
| 2008/0126541 | A1 | 5/2008 | Rosenberg et al. | |
| 2008/0141034 | A1 * | 6/2008 | Bartram et al. | 713/176 |
| 2008/0146193 | A1 | 6/2008 | Bentley et al. | |
| 2008/0152113 | A1 | 6/2008 | Chang et al. | |
| 2008/0195861 | A1 * | 8/2008 | Salomone | 713/155 |
| 2008/0235043 | A1 | 9/2008 | Goulandris et al. | |
| 2008/0294655 | A1 | 11/2008 | Picault et al. | |
| 2009/0037985 | A1 * | 2/2009 | Bentley et al. | 726/5 |
| 2009/0125435 | A1 * | 5/2009 | Cohen et al. | 705/37 |
| 2009/0125721 | A1 | 5/2009 | Numaoka | |
| 2009/0131015 | A1 * | 5/2009 | Bentley et al. | 455/411 |
| 2009/0133106 | A1 * | 5/2009 | Bentley et al. | 726/5 |
| 2009/0133117 | A1 * | 5/2009 | Bentley et al. | 726/17 |
| 2009/0193514 | A1 * | 7/2009 | Adams et al. | 726/17 |

OTHER PUBLICATIONS

Brainard et al., "Fourth-factor authentication: somebody you know," Association of Computing Machinery Conference on Computer and Communication Security, Oct. 30-Nov. 3, 2006, pp. 168-178, 11 pages.

Avaya Inc., GB Patent Application No. GB081291.1, Search Report dated Jan. 27, 2009, 3 pages.

Avaya Inc., JP Patent Application No. 2008-194375, Office Action dated Sep. 28, 2012, 2 pages.

\* cited by examiner

CONTINUAL PEER AUTHENTICATION

CROSS REFERENCE TO RELATED APPLICATIONS

The underlying concepts, but not necessarily the language, of the following case are incorporated by reference:

U.S. patent application Ser. No. 11/832,574, filed 1 Aug. 2007, which is published as U.S. Patent Application Publication No. 2009/0037985. If there are any contradictions or inconsistencies in language between this application and the case that has been incorporated by reference that might affect the interpretation of the claims in this case, the claims in this case should be interpreted to be consistent with the language in this case.

FIELD OF THE INVENTION

The present invention relates to security in general, and, more particularly, to authentication.

BACKGROUND OF THE INVENTION

Peer authentication is a method by which a first user is authenticated by a second user. (Note that, as in the term peer-to-peer communication, the word "peer" is used generically and has no connotation regarding the professional or social standing of the users.) An example of peer authentication is illustrated by the following familiar scenario: an employee in the lobby of a corporate building realizes that she accidentally left her corporate badge at home, and that therefore she will not be allowed to enter the building proper without some other means of authentication. She therefore approaches the guard in the lobby and tells the guard that she is an employee, but that she doesn't have her badge.

The guard then:
asks the employee for her name;
looks up the name in a computer database;
notes the employee's office number;
submits a query to the database to determine who the employee's officemate is; and
calls the officemate, asking him to come to the lobby to identify the alleged employee.
The officemate arrives at the lobby, and then either:
verifies that the alleged employee is indeed an employee of the company, or
tells the guard that he does not recognize the alleged employee.

In the former case, the guard issues the employee temporary identification and permits both employees to advance past the lobby, while in the latter case, the guard stops the alleged employee from advancing past the lobby, and perhaps takes some additional action (e.g., calls the police, etc.).

In a variation of the above scenario, the guard, rather than asking the officemate to come to the lobby, might ask the officemate to talk to the alleged employee over the phone. The officemate talks to the alleged employee over the phone, and determines whether the alleged employee is in fact who she claims to be, based on the telephone conversation (e.g., based on her voice, based on her answers to one or more questions, etc.). The officemate then informs the guard whether the alleged employee should be allowed to advance past the lobby.

SUMMARY OF THE INVENTION

The present invention provides a mechanism for orchestrating peer authentication during an ongoing electronic communication session, which we will term a call (e.g., a telephone call, a conference call between three or more parties, an instant messaging [IM] chat session, etc.). The mechanism is particularly useful in detecting malicious behavior that might occur during a conference call. For example, during an important business conference call—say, concerning the merger of two corporations—one of the participants might have to sneak out of his office momentarily for a bathroom break, during which a malicious user could come in to the office and overhear confidential information, or even impersonate the other person.

In accordance with the illustrative embodiment of the present invention, a user is first authenticated in order to participate in a call (e.g., via entering a password, etc.), and subsequently during the call the user may be peer authenticated. In particular, a user who participates in a call might be prompted to authenticate another user on the call based on particular events or user behavior during the call. For example, if a first user is silent for a given length of time during the call, a second user on the call (i.e., a "peer") might be prompted to authenticate the first user (the theory being that, perhaps, another person has maliciously taken the first user's place and is passively listening to the call). As another example, if a first user is participating in a call via a wireless telecommunications terminal, a second user on the call might be prompted to authenticate the first user if the first user has entered a public area in which there is a greater likelihood of malicious behavior.

In accordance with the present invention, a peer might be prompted to authenticate a user in a variety of ways. In some embodiments, for example, a text message might appear on the display of the peer's terminal, asking the peer whether or not a particular user's voice sounds correct. Alternatively, in some other embodiments of the present invention, a text message might prompt the peer to (1) ask a particular user a question that only the actual user would know the answer to, and (2) enter a number between 1 and 5 indicating the peer's confidence in the user's identity.

When there are three or more users participating in a call, then in some embodiments of the present invention the selection of the peer might occur randomly, while in some other embodiments the selection might be based on a variety of criteria (e.g., based on an indication of how well the users know each other, as disclosed in U.S. patent application Ser. No. 11/832,574, which is published as U.S. Patent Application Publication No. 2009/0037985, incorporated by reference, etc.)

The illustrative embodiment comprises: presenting an authentication challenge to a first user who wishes to participate in a call; admitting the first user to the call when the authentication challenge is met; and generating during the call, after the admission of the first user, a signal that prompts a second user participating in the call to authenticate the first user.

DETAILED DESCRIPTION

For the purposes of this specification, the term "peer" is defined as a user. In accordance with the illustrative embodiment, two users are considered peers if they participate in a particular call; the term does not impose any constraints on the relative ranks, status, etc. of the users.

Figure 1:
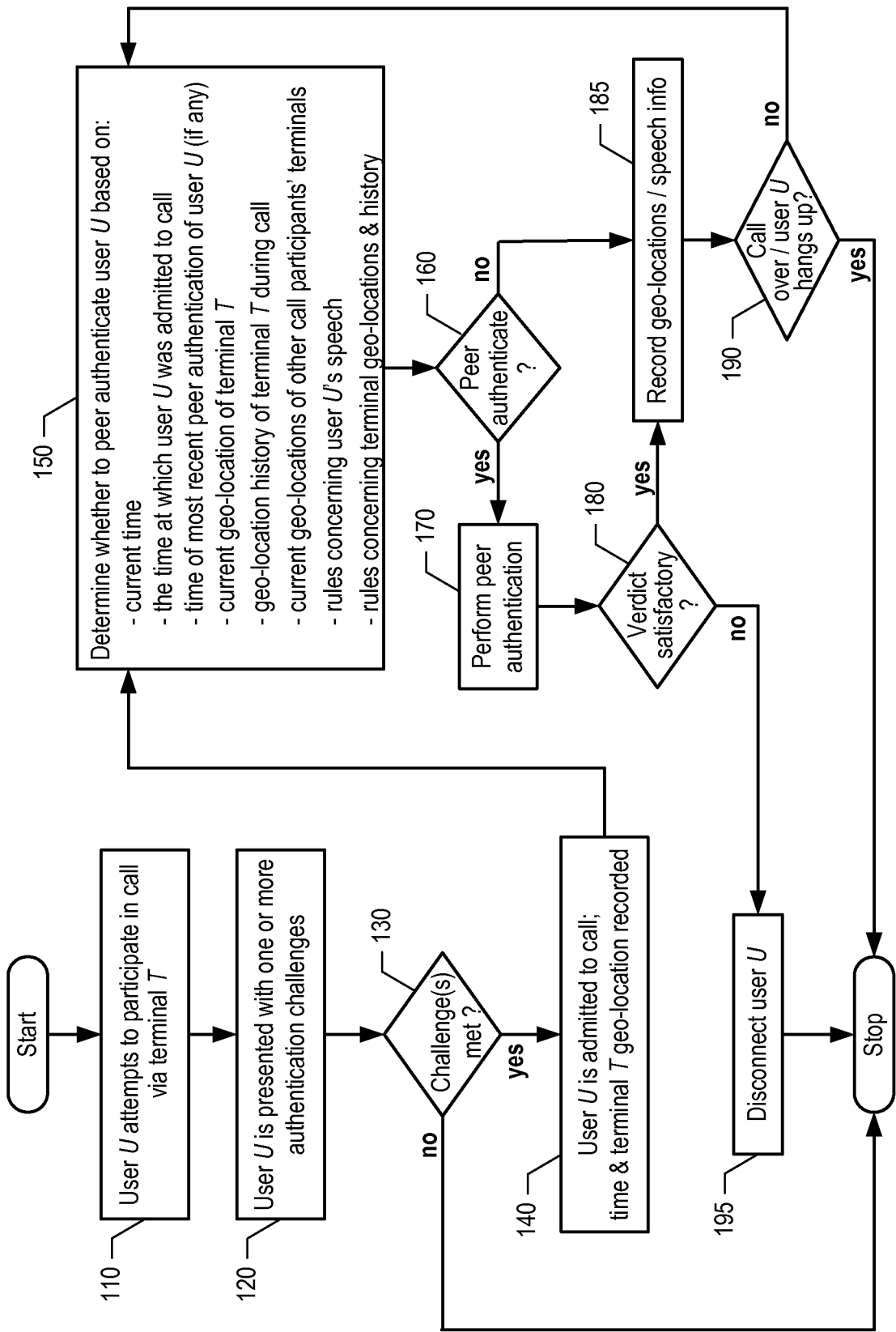
FIG. 1 depicts a flowchart of salient tasks of the method of the present invention, in accordance with the illustrative embodiment of the present invention.

FIG. 1 depicts a flowchart of salient tasks of the method of the present invention, in accordance with the illustrative embodiment of the present invention. As will be appreciated by those skilled in the art, in some embodiments of the present invention one or more tasks of FIG. 1 might be performed by a telecommunications terminal, while in some other embodiments, one or more tasks of FIG. 1 might be performed by another telecommunications or data-processing system (e.g., a teleconferencing system, a private branch exchange [PBX], a gateway, a server, etc.), while in still some other embodiments, the tasks of FIG. 1 might be performed by different entities (for example, task 110 performed by the user of a terminal, task 120 performed by the terminal itself, task 130 performed by a gateway, and so forth). In any case, it will be clear to those skilled in the art, after reading this disclosure, how to make and use such embodiments of the present invention. Moreover, it will be clear to those skilled in the art, after reading this disclosure, which tasks depicted in FIG. 1 can be performed simultaneously or in a different order than that depicted.

At task 110, user U attempts to participate in a call via his or her telecommunications terminal T, in well-known fashion.

At task 120, user U is presented with one or more authentication challenges (e.g., a username/password challenge, etc.), in well-known fashion.

At task 130, the method branches based on whether the authentication challenge(s) presented at task 120 were met by user U. If so, execution continues at task 140, otherwise, the method of FIG. 1 terminates.

At task 140, user U is admitted to the call, and the current time and geo-location of terminal T are recorded, in well-known fashion.

Task 150 determines whether user U should be peer authenticated based on a variety of criteria, including:
  the current time,
  the time at which user U was admitted to call,
  the time of the most recent peer authentication of user U (if any),
  the current geo-location of terminal T,
  the geo-location history of terminal T during the call,
  the current geo-locations of other call participants' terminals,
  one or more rules concerning user U's speech, and
  one or more rules concerning terminal geo-locations and history.

Some examples of rules concerning user U's speech might include:
  peer authenticate when user U speaks for the first time
  peer authenticate when user U has been silent for at least N seconds, where N is a positive number
  peer authenticate when user U speaks for the first time after being silent for at least M seconds, where M is a positive number
  peer authenticate when user U speaks for less than a given fraction f of the time over a given time interval Some examples of rules concerning terminal geo-locations and history might include:
  peer authenticate when terminal T moves to a new geo-location
  peer authenticate every K minutes when terminal T is in an area that is deemed to be particularly vulnerable to security attacks, where K is a positive number
  peer authenticate when terminal T has been in three or more different areas in the last L minutes, where L is a positive number
  peer authenticate when terminal T has moved from being within 5 meters of another call participant to being at least 100 meters away from any other call participant At task 160, the method branches based on whether it was determined at task 150 to peer authenticate user U. If so, execution continues at task 170, otherwise, execution proceeds to task 185.

At task 170, peer authentication of user U is performed, as described in detail below and with respect to FIG. 2.

At task 180, the method branches based on whether the verdict received by the peer is deemed to be "satisfactory". As described below and with respect to task 230 of FIG. 2, in some embodiments of the present invention the peer might provide a simple yes/no verdict, while in some other embodiments, the peer might provide a degree of confidence (e.g., an integer between 1 and 5 inclusive, etc.). As will be appreciated by those skilled in the art, in the latter case, the notion of whether a verdict is judged satisfactory is an implementation-specific issue that might be determined by a systems administrator, a Chief Information Officer of an enterprise, a programmer, etc.

If the verdict is satisfactory, execution continues at task 185, otherwise execution continues at task 195.

At task 185, the current geo-locations of the call participants' terminals are recorded, and information about user U's speech is updated (e.g., how long user U has been silent, the fraction of time during the call that user U speaks, etc.).

Task 190 checks whether the call has terminated or user U has hung up. If either of these events has occurred, the method of FIG. 1 terminates, otherwise execution continues back at task 150.

At task 195, user U is disconnected from the call, and any appropriate action is taken (e.g., alerting security personnel, etc.). After task 195, the method of FIG. 1 terminates.

Figure 2:
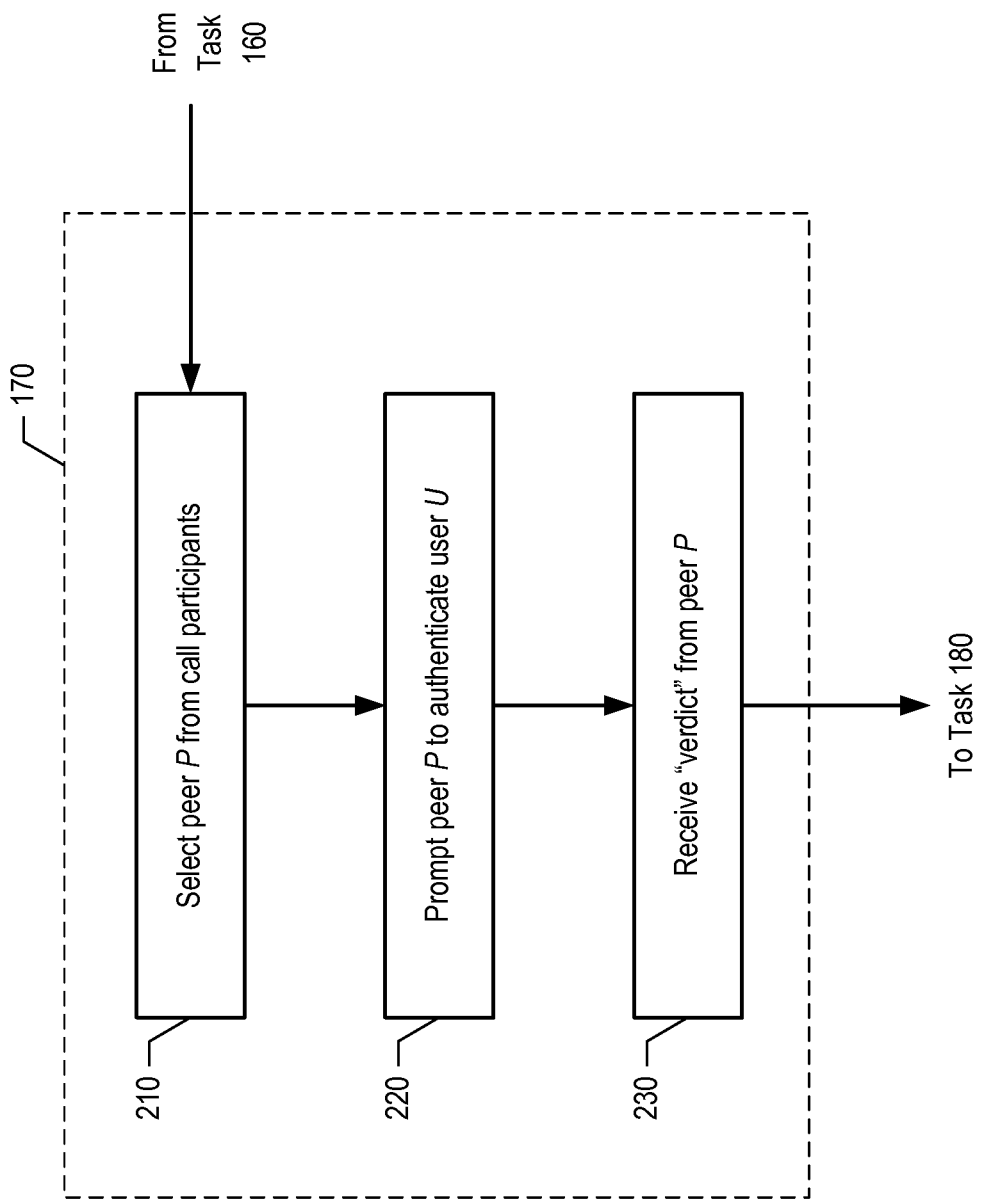
FIG. 2 depicts a detailed flowchart for task 170, as shown in FIG. 1, in accordance with the illustrative embodiment of the present invention.

FIG. 2 depicts a detailed flowchart for task 170, in accordance with the illustrative embodiment of the present invention.

At task 210, a peer P is selected from among the call participants for authenticating user V. (Naturally, if there is only one other call participant besides user V, then that person must be peer P.) As will be appreciated by those skilled in the art, there are a variety of possible criteria by which a peer might be selected; several such criteria, along with selection methods based on these criteria, are disclosed in U.S. patent application Ser. No. 11/832,574, which is published as U.S. Patent Application Publication No. 2009/0037985, which is incorporated by reference.

At task 220, peer P is prompted to authenticate user U (e.g., via a text message, via an audible message, etc.). As will be appreciated by those skilled in the art, in some embodiments of the present invention the prompting might specify particular instructions for authenticating user U (e.g., "ask user U a question only he or she would know", etc.), while in some other embodiments, the prompt might simply ask peer P to indicate whether he thinks user U is who she claims to be.

At task 230, the "verdict" from peer P (e.g., a yes/no answer, a degree of confidence on a numerical scale, etc.) is received. After task 230, execution continues at task 180 of FIG. 1.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
presenting by a data-processing system an authentication challenge to a first user who wishes to participate in a call;
admitting by said data-processing system said first user to said call when said authentication challenge is met; and
generating by said data-processing system during said call, after the admission of said first user, a signal that prompts a second user participating in said call to authenticate said first user, wherein the second user consists of a human.

2. The method of claim 1 wherein the generation of said signal is in response to said first user speaking for the first time during said call.

3. The method of claim 1 wherein the generation of said signal is in response to said first user speaking after being silent for at least N seconds, wherein N is a positive number.

4. The method of claim 1 wherein the generation of said signal is in response to said first user being silent for at least N seconds, wherein N is a positive number.

5. The method of claim 1 wherein the generation of said signal is in response to said first user speaking for less than a fraction f of time over a time interval.

6. The method of claim 1 wherein the generation of said signal is in response to said first user speaking for no more than N seconds contiguously over a time interval, wherein N is a positive number.

7. The method of claim 1 wherein said first user participates in said call via a wireless telecommunications terminal, and wherein the generation of said signal is in response to a change in location of said wireless telecommunications terminal.

8. The method of claim 1 further comprising selecting by said data-processing system said second user from a plurality of users who are participating in said call.

9. A method comprising:
presenting by a data-processing system an authentication challenge to a first user who wishes to participate in a call;
admitting by said data-processing system said first user to said call at time $t_1$ when said authentication challenge is met; and
generating by said data-processing system during said call, at time $t_2$, a signal that prompts a second user participating in said call to authenticate said first user, wherein $t_2 > t_1$, and wherein the second user consists of a human.

10. The method of claim 9 wherein said time $t_2$ is based on when said first user speaks during said call.

11. The method of claim 9 wherein said first user participates in said call via a wireless telecommunications terminal, and wherein said time $t_2$ is based on at least one location of said wireless telecommunications terminal during time interval $[t_1, t_2]$.

12. The method of claim 9 wherein said first user participates in said call via a wireless telecommunications terminal, and wherein the magnitude of $t_2 - t_1$ is based on at least one location of said wireless telecommunications terminal during time interval $[t_1, t_2]$.

13. The method of claim 9 wherein the magnitude of $t_2 - t_1$ is based on a metric of said first user's speaking during said call.

14. The method of claim 13 wherein the magnitude of $t_2 - t_1$ is based on the length of a time interval over which said first user is silent.

15. The method of claim 13 wherein the magnitude of $t_2 - t_1$ is based on the fraction of time interval $[t_1, t_2]$ over which said first user is silent.

16. The method of claim 9 further comprising selecting by said data-processing system said second user from a plurality of users who are participating in said call.

17. A method comprising:
presenting by a data-processing system an authentication challenge to a first user who wishes to participate in a call;
admitting by said data-processing system said first user to said call at time $t_1$ when said authentication challenge is met;
generating by said data-processing system during said call, at time $t_2$, a first signal that prompts a second user participating in said call to authenticate said first user, wherein the second user consists of a human; and
generating by said data-processing system during said call, at time $t_3$, a second signal that prompts a third user participating in said call to authenticate said first user, wherein $t_3 > t_2 > t_1$.

18. The method of claim 17 wherein said first user participates in said call via a wireless telecommunications terminal, and wherein the magnitude of $t_3 - t_2$ is based on at least one location of said wireless telecommunications terminal during time interval $[t_2, t_3]$.

19. The method of claim 17 wherein the magnitude of $t_3 - t_2$ is based on a metric of said first user's speaking during time interval $[t_2, t_3]$.

20. The method of claim 17 further comprising:
selecting by said data-processing system said second user from a plurality of users who are participating in said call at said time $t_2$; and
selecting by said data-processing system said third user from a plurality of users who are participating in said call at said time $t_3$.

* * * * *